US007247793B2

(12) United States Patent
Hinkson et al.

(10) Patent No.: US 7,247,793 B2
(45) Date of Patent: Jul. 24, 2007

(54) WALL PLATE ADAPTER FOR COUPLING HOME NETWORK CONTROL SIGNALS TO AC POWER WIRING

(75) Inventors: Richard H. Hinkson, Plainview, NY (US); John J. Ryan, Seaford, NY (US); George N. Wilson, Maspeth, NY (US)

(73) Assignee: Honeywell International Inc., Morristown, NJ (US)

( * ) Notice: Subject to any disclaimer, the term of this patent is extended or adjusted under 35 U.S.C. 154(b) by 173 days.

(21) Appl. No.: 11/051,076

(22) Filed: Feb. 4, 2005

(65) Prior Publication Data

US 2006/0178042 A1 Aug. 10, 2006

(51) Int. Cl.
*H02G 3/16* (2006.01)
*H01R 11/00* (2006.01)

(52) U.S. Cl. .......................... 174/66; 174/67; 220/241; 220/242; 439/502; 439/536

(58) Field of Classification Search .................. 174/66, 174/67, 135, 53, 17 CT, 50; 220/241, 242, 220/3.8; D13/156, 177; 439/535, 536, 652, 439/352, 502
See application file for complete search history.

(56) References Cited

U.S. PATENT DOCUMENTS 2,385,620 A * 4/1945 Fleckenstein ................ 174/66
3,522,595 A * 8/1970 White ......................... 174/66
3,739,226 A * 6/1973 Seiter et al. .................. 174/66
4,617,613 A * 10/1986 Rice ........................... 439/536
4,897,049 A * 1/1990 Miller et al. ................ 439/652
5,384,428 A * 1/1995 Luu ............................ 174/66
5,638,947 A * 6/1997 Fenne ......................... 174/66
6,297,450 B1 * 10/2001 Yu ............................. 174/66
D463,367 S * 9/2002 Luu ....................... D13/139.1

OTHER PUBLICATIONS

Data sheet, Power Sentry Wall Plate Surge Protector, Fiskars Consumer Products, Inc., 1 p., Jan. 2002.

* cited by examiner

*Primary Examiner*—Angel R. Estrada
(74) *Attorney, Agent, or Firm*—Scully, Scott, Murphy & Presser, P.C.

(57) ABSTRACT

A wall plate adapter for coupling home network control signals to AC power wiring, where the wall plate adapter includes built-in signaling circuitry. The wall plate adapter includes a plate with a receptacle face with slots that are aligned with slots of an underlying AC receptacle. When prongs of a plug are inserted into the slots of the wall plate adapter, they touch contacts that are located in the slots of the receptacle face. The contacts are, in turn, coupled to the signaling circuitry, which may be located in an enlarged region of the wall plate. The signaling circuitry is only coupled to the AC power when a plug is inserted. The plug may be coupled to a transformer and a network device.

13 Claims, 3 Drawing Sheets

WALL PLATE ADAPTER FOR COUPLING HOME NETWORK CONTROL SIGNALS TO AC POWER WIRING

BACKGROUND OF THE INVENTION

1. Field of Invention

The invention relates generally to a wall plate adapter that replaces existing wall plates of electrical outlets and, more particularly, to a wall plate adapter that includes circuitry for interacting with a home network via the AC power wiring of the electrical outlets.

2. Description of Related Art

Various types of home automation networks are currently available for controlling different functions in the home, such as heating and cooling, lights, home entertainment, kitchen appliances, computers, sprinklers and security devices. In particular, networks such as those conforming to the X10 standard use the existing alternating current (AC) power lines in a home or other structure as a network media to carry data. Such networks can include transmitter units, receiver units, and bidirectional units that can receive and transmit commands. X-10 transmissions are synchronized to the zero-crossing point of the AC power line. A binary 1 is represented by a 1 ms burst of 120 KHz at the zero-cross point and a binary 0 by the absence of a burst. The receiving units may perform various functions such as turning the power on or off to an appliance such as a lamp, or adjusting the amount of power provided to the appliance, such as to provide a dimming function for a lamp. Transmitter units may send predefined commands to a specified receiving unit automatically, such as based on a timer, or based on a manual user command, such as the activation of a switch on a control panel. Bidirectional units may send their current status (e.g., on or off) upon request. Furthermore, an address can be associated with each device so that individual devices can be controlled.

Typically, control signals are coupled to the power lines in a home or other structure using either standalone adapters or low-voltage transformers with the coupling circuitry built in. However, when a separate adapter is used, a typical system uses two AC receptacles, causing inconvenience to the end user. Moreover, if the coupling circuitry is built into the low-voltage transformer, multiple versions of the transformer are needed for use with different output voltages. This results in additional design time and cost.

BRIEF SUMMARY OF THE INVENTION

The present invention addresses the above and other issues by providing a wall plate adapter for coupling home network control signals to AC power wiring, where the wall plate adapter includes built-in signaling circuitry.

In particular, in one aspect of the invention, a wall plate adapter for an electrical outlet includes a plate with at least one receptacle face. The at least one receptacle face overlays at least one receptacle of the electrical outlet when the plate is secured over the electrical outlet. The at least one receptacle face has slots aligned with slots of the at least one receptacle so that prongs of a plug can be plugged into the slots of the at least one receptacle after passing through the slots of the at least one receptacle face. At least one electrical contact is carried by the wall plate and located so that it touches at least one of the prongs of the plug when the plug is plugged into the slots of the at least one receptacle. The wall plate adapter further includes circuitry that is provided for communicating, via the at least one electrical contact, with AC power wiring of the at least one receptacle, when the plug is plugged into the slots of the at least one receptacle.

In another aspect, a wall plate adapter for an electrical outlet includes a plate with at least first and second receptacle faces. The first and second receptacle faces overlay first and second receptacles, respectively, of the electrical outlet when the plate is secured over the electrical outlet. The first receptacle face has slots aligned with slots of the first receptacle so that prongs of a first plug can be plugged into the slots of the first receptacle after passing through the slots of the first receptacle face. The second receptacle face has slots aligned with slots of the second receptacle so that prongs of a second plug can be plugged into the slots of the second receptacle after passing through the slots of the second receptacle face. At least one electrical contact is carried by the wall plate and located so that it touches at least one of the prongs of the first plug when the first plug is plugged into the slots of the first receptacle. Circuitry is provided for communicating, via the at least one electrical contact, with AC power wiring of the first receptacle of the electrical outlet when the plug is plugged into the slots of the first receptacle.

In another aspect, a system for use in a network which uses AC power wiring of a structure includes a device in the network, a transformer for receiving electrical power from an electrical receptacle that is coupled to the AC power wiring, and providing transformed electrical power to the device, and a wall plate for the electrical receptacle. The wall plate includes a communication module that is electrically coupled to the transformer and the electrical receptacle when the transformer is plugged into the electrical receptacle using prongs of a plug, and the device includes at least one of a transmitter and a receiver for communicating with the communication module in the wall plate via the prongs of the plug.

BRIEF DESCRIPTION OF THE DRAWINGS

In the drawings.

In all the Figures, corresponding parts are referenced by the same reference numerals.

DETAILED DESCRIPTION OF THE INVENTION

Figure 1A:
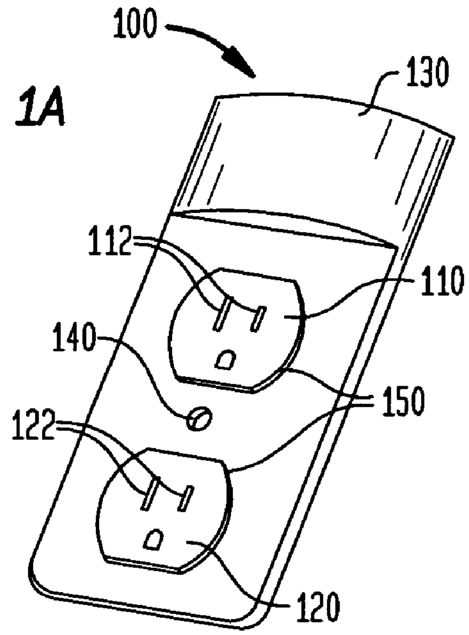
FIG. 1*a* illustrates a perspective view of a wall plate adapter, according to the invention.
Figure 2:
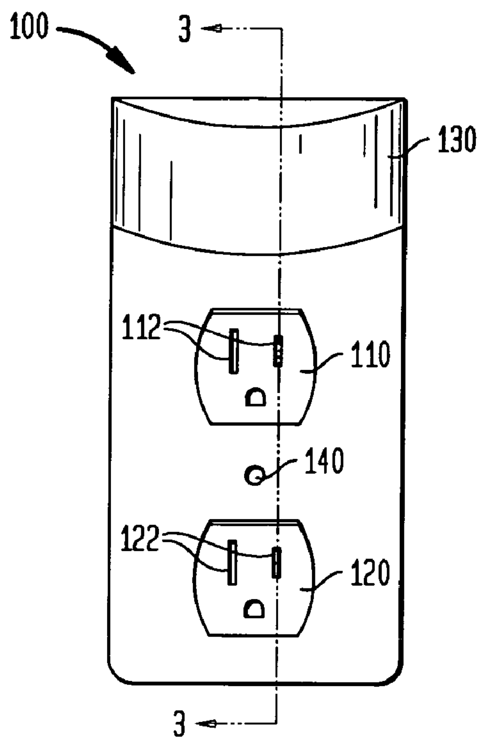
FIG. 2 illustrates a front view of the wall plate adapter of FIG. 1*a*, according to the invention.

FIG. 1*a* illustrates a perspective view of a wall plate adapter, according to the invention, while FIG. 2 illustrates a front view of the wall plate adapter of FIG. 1*a*, according to the invention. The invention provides a wall plate 100 with built in signaling circuitry for transmitting and/or receiving control signals via an AC power network. An existing conventional wall plate can be easily replaced by the wall plate of the invention, such as by removing the center mounting screw of the old plate, removing the old plate from the wall, and installing the new plate using the screw through the hole 140. The new wall plate 100 covers the existing receptacles of an outlet, and includes receptacle faces 110 and 120, that is, what appear to be the faces of receptacles, including slots 112 and 122 that are aligned with the slots in the actual AC receptacle below the wall plate. For example, the receptacles can be polarized two-slot receptacles or three-slot grounded receptacles, both of which are commonly used. The slots can be linear or have any other shape. For aesthetic purposes, an outline 150 of the receptacles can be inscribed around the slots in the wall plate so that the receptacle faces appear to be actual receptacles. The wall plate may be made of injected molded plastic, for instance, and can be of any style, including a standard style and a Decora style.

Figure 1B:
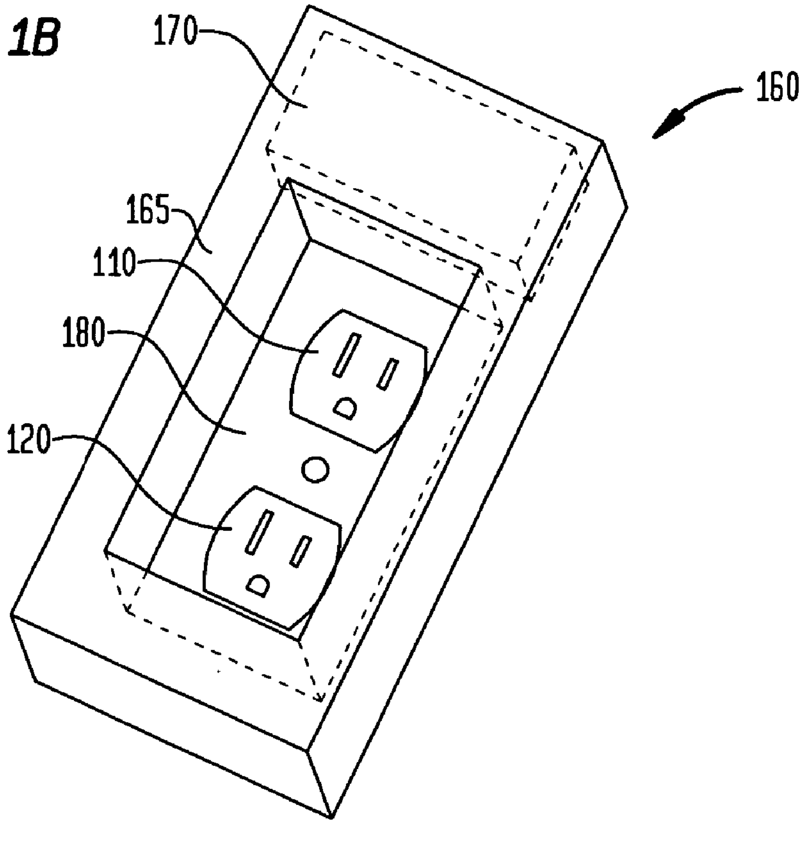
FIG. 1*b* illustrates a perspective view of an alternative design of a wall plate adapter, according to the invention.

Additionally, the wall plate 100 houses communication circuitry, such as in an enlarged region 130 above or below the receptacle faces 110 and 120. The enlarged region 130 may be integrally formed with the wall plate 100 such as by a raised surface on the wall plate, for instance. In another approach, the communication circuitry can be attached to the wall plate in a separate housing, such as by using adhesive, fasteners, a snap-fit or the like. Depending on the size of the communication circuitry, and the thickness of the wall plate, an enlarged region may not be needed, in which case a uniform profile may be used for the wall plate, as shown in FIG. 1*b*. FIG. 1*b* illustrates a perspective view of an alternative design of a wall plate adapter, according to the invention. In this case, the wall plate 160 includes a top surface 165 and an inset region 180 in which the receptacle faces 110 and 120 are located. The communications circuitry is shown as being located in a dashed region 170. The communications circuitry can, in fact, be located anywhere along the periphery of the wall plate 160. Other variations will be apparent to those skilled in the art.

Figure 3:
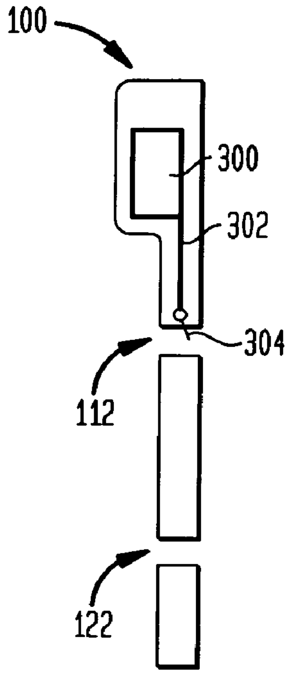
FIG. 3 illustrates a cross-sectional profile view of the wall plate adapter of FIG. 2, according to the invention.
Figure 4:
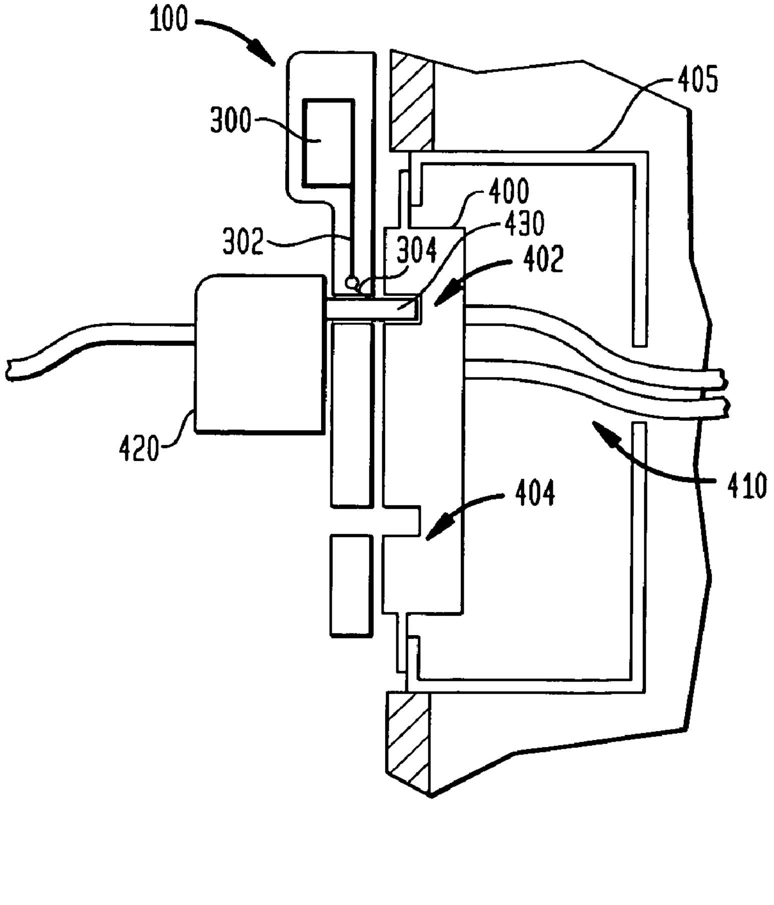
FIG. 4 illustrates the cross-sectional profile view of the wall plate adapter of FIG. 3, with a plug inserted into an outlet, according to the invention.

FIG. 3 illustrates a cross-sectional profile view of the wall plate adapter of FIG. 2, according to the invention. FIG. 4 illustrates the cross-sectional profile view of the wall plate adapter of FIG. 3, with a plug inserted into an outlet, according to the invention. The slots 112 and 122 in the wall plate 100 may contain contacts 304 that touch the prongs 430 of a plug 420 when the prongs 430 are passed through the slots 112 of the wall plate 100 and plugged into the receptacle 402 of the outlet 400. The outlet 400 is mounted in a junction box 405 and includes AC power wiring 410 that extends to an AC power source in the home. The outlet 400 includes a further receptacle 404, which, in this example, is not coupled to the communications circuitry 300. In practice, two electrical contacts may be provided, one each for the hot and neutral prongs of a receptacle. The contacts 304 may be conductive structures such as metal springs that maintain a physical contact with the prongs 430. The contacts 304 extend by electrical paths such as wires 302 to the communications circuitry 300 to electrically couple the communications circuitry 300 to the AC power lines. 410 of the receptacle 402. In this manner, the communication circuitry 300 is linked to the receptacle 402 when any plug 420 is plugged into the receptacle via the wall plate. Furthermore, advantageously, for safety reasons, the contacts 304 and the communication circuitry 300 are electrically isolated from the AC power when no plug is plugged in.

Note that for dual or other multi-receptacle outlets, the contacts need be provided for only one of the receptacles to control one device in a network. Optionally, the wall plate can include multiple receptacle faces which each have associated contacts and communications circuitry. In another option, the wall plate does not have a receptacle face that covers a receptacle that is not used for communicating via the AC power lines. The wall plate can have an aperture that allows a plug to be plugged directly into such a receptacle.

The plug 420 in the example of FIG. 4 includes a housing with a transformer and prongs, where the plug leads to a network device via standard household electrical wire. In other examples, such as when the transformer is built into the network device, the plug may be a conventional plug with no transformer, where standard household electrical wire leads from the plug to the network device.

Figure 5:
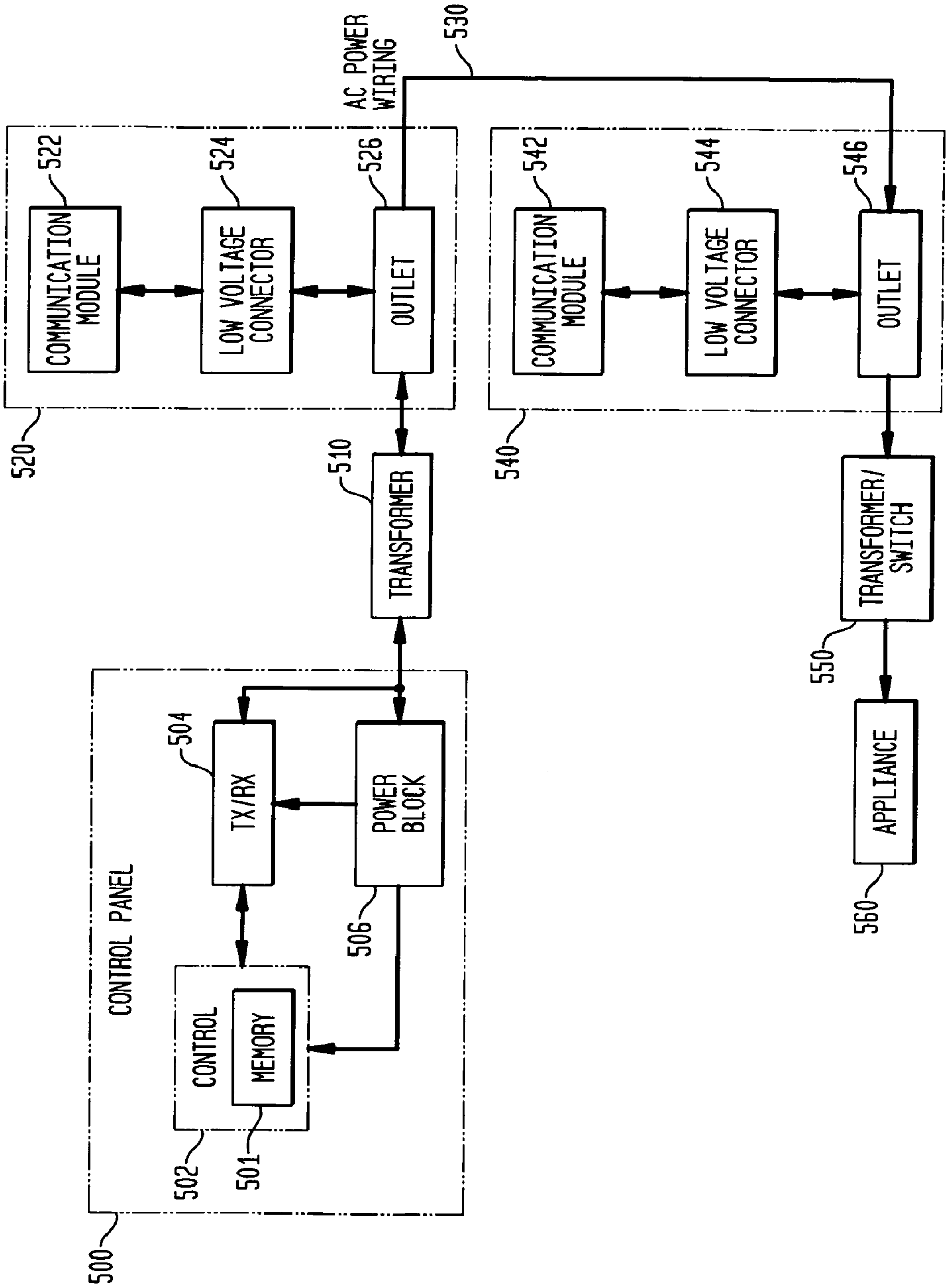
FIG. 5 illustrates a block diagram of systems of network devices and associated wall plates communicating with one another, according to the invention.

FIG. 5 illustrates a block diagram of systems of network devices and associated wall plates communicating with one another, according to the invention. In practice, the network device that is to interact in the network, such as by sending and/or receiving commands, can be plugged into the receptacle in which the contacts for the associated communication circuitry are provided in the modified wall plate. In accordance with the invention, a network device can use any low voltage transformer having the desired output voltage, without requiring special circuitry to be built in, since the communication circuitry is separate from the transformer. In the example of FIG. 5, a network device 500 has a transmitter and receiver (transceiver) module 504, which is capable of both transmitting signals to, and receiving signals from, the communications module 522 in the wall plate 520. For example, the network device 500 may be a control panel or console of a security system which turns different lights on and off in the home, or which arms or disarms different sensors such as motion sensors and door/window switches in the home. Note that the network device can operate automatically or in response to a user input such as when the user actuates a switch or push button sequence, or provides a voice command, or the like.

The network device 500, including the transceiver 504, control 502, and memory 501, for example, are powered by a power block 506, which, in turn, receives power from a transformer 510 that is plugged into the outlet 526 using the wall plate 520. The transformer 510 can be built into the network device 500 or can be external to the network device 500. The transformer 510 is used to reduce the voltage of the AC power from the outlet 526 to a level that can be used by the transceiver 504 and other components in the control panel 500.

As an example, the control 502 can activate the transceiver 504 to transmit a signal to a designated receiving unit 550, which includes a transformer and a switch for controlling the power supplied to an appliance 560 such as a lamp. The receiving unit 550 is also considered to be a network device. The signal transmitted by the transceiver 504 may be a low voltage, e.g., 0-5 V, base band gated on-off signal that is modulated to include an address or other identifier of the receiving unit 550 or, more specifically, of the communication module 542 in the wall plate 540 that the receiving unit 550 is plugged into. The modulated signal is coupled to the communication module 522 via the wiring in the transformer 510 and the prongs of a plug that is plugged into the outlet 526. The modulated signal is coupled from the prongs of the plug to the contacts 304 (FIGS. 3 and 4) in the slots 112 of the receptacle face 110 of the wall plate, and from the contacts to the communications module 522.

The communications module 522 receives power from the AC power at the outlet 526 via a small low voltage connector 524 that can be built into the wall plate 520. The communications module 522 is responsive to the modulated signal from the transceiver 504 for transmitting its own modulated signal according to the protocol used by the AC power network, such as X10. This modulated signal can include the address of the communication module 542 associated with the receiving unit 550. Note that, in a setup procedure, the addresses of different communication modules can be provided to a central control such as the network device 500, by manual programming or other approach. Different communication modules may receive the signal from the communication module 522, but only the communication module 542 responds since it is the addressed module. The communications module 542 demodulates and decodes the low power output signal of the low voltage connector 544 to receive the command from the communications module 522. The communications module 542 responds to the command by transmitting a command to the receiving unit 550, such as to instruct the switch to close to send the AC power from the outlet 546 to the appliance 560, e.g., to turn on a lamp. In particular, the communications module 542 communicates with the receiving unit 550 via the contacts that are touching the prongs of the electrical wire coupled to the receiving unit 550.

For a receiving unit that includes an on/off switch or dimmer for controlling a lamp, for instance, a transformer is used to reduce the voltage of the AC power to a level that can be used by the switch or dimmer.

In the example provided, a one-way communication is provided from one network device to another. However, other communications, including two-way communications between network devices, and communications from one network device to multiple devices concurrently, are also possible. Various other examples will be apparent to those skilled in the art.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but should be construed to cover all modifications that may fall within the scope of the appended claims.

What is claimed is:

1. A wall plate adapter for an electrical outlet, comprising:

a plate with at least one receptacle face;

wherein the at least one receptacle face overlays at least one receptacle of the electrical outlet when the plate is secured over the electrical outlet;

the at least one receptacle face having slots aligned with slots of the at least one receptacle so that prongs of a plug can be plugged into the slots of the at least one receptacle after passing through the slots of the at least one receptacle face;

at least one electrical contact carried by the wall plate and located so that the at least one electrical contact touches at least one of the prongs of the plug when the plug is plugged into the slots of the at least one receptacle; and circuitry for communicating, via the at least one electrical contact, with AC power wiring of the at least one receptacle, when the plug is plugged into the slots of the at least one receptacle, the circuitry comprising at least one transmitter for transmitting a signal for use in a network via the AC power wiring and at least one receiver for receiving a command from a network via the AC power wiring.

2. The wall plate adapter of claim 1, wherein:

the circuitry receives a command from a device in the network via an electrical path coupled to the device and the at least one of the prongs of the plug; and the transmitter is responsive to the received command.

3. The wall plate adapter of claim 1, wherein:

responsive to the received command, the circuitry transmits a command to a device in the network via an electrical path coupled to the device and the at least one of the prongs of the plug.

4. The wall plate adapter of claim 1, wherein:

the plate includes a region for housing at least part of the circuitry.

5. The wall plate adapter of claim 4, wherein:

the region is formed by a raised surface of the plate.

6. The wall plate adapter of claim 1, wherein:

the at least one electrical contact comprises a spring.

7. The wall plate adapter of claim 1, wherein:

the at least one electrical contact is electrically isolated from the at least one receptacle when the plug is not plugged into the slots of the at least one receptacle.

8. The wall plate adapter of claim 1, further comprising:

a low voltage connector carried by the plate for providing power to the circuitry from the at least one receptacle, and via the at least one of the prongs of the plug.

9. The wall plate adapter of claim 1, wherein:

the at least one electrical contact is located so that it extends at least partially into at least one of the slots of the at least one receptacle face.

10. A wall plate adapter for an electrical outlet, comprising:

a plate with at least first and second receptacle faces;

wherein the first and second receptacle faces overlay first and second receptacles, respectively, of the electrical outlet when the plate is secured over the electrical outlet;

the first receptacle face having slots aligned with slots of the first receptacle so that prongs of a first plug can be plugged into the slots of the first receptacle after passing through the slots of the first receptacle face;

the second receptacle face having slots aligned with slots of the second receptacle so that prongs of a second plug can be plugged into the slots of the second receptacle after passing through the slots of the second receptacle face;

at least one electrical contact carried by the wall plate and located so that the at least one electrical contact touches at least one of the prongs of the first plug when the first plug is plugged into the slots of the first receptacle; and circuitry for communicating, via the at least one electrical contact, with AC power wiring of the first receptacle of the electrical outlet when the plug is plugged into the slots of the first receptacle, the circuitry comprising at least one transmitter for transmitting a signal for use in a network via the AC power wiring and at least one receiver for receiving a command from a network via the AC power wiring.

11. The wall plate adapter of claim 10, wherein:

the second receptacle is uncoupled from the circuitry.

12. The wall plate adapter of claim 10, wherein:

the at least one electrical contact is located so that it extends at least partially into at least one of the slots of the first receptacle face.

13. A system for use in a network which uses AC power wiring of a structure, comprising:

a device in the network;

a transformer for receiving electrical power from an electrical receptacle that is coupled to the AC power wiring, and providing transformed electrical power to the device; and a wall plate for the electrical receptacle;

wherein: the wall plate includes a communication module that is electrically coupled to the transformer and the electrical receptacle when the transformer is plugged into the electrical receptacle using prongs of a plug; and the device includes at least one transmitter and at least one receiver for communicating with the communication module in the wall plate via the prongs of the plug.

* * * * *